United States Patent
Roe et al.

(10) Patent No.: US 7,185,321 B1
(45) Date of Patent: Feb. 27, 2007

(54) METHOD AND SYSTEM FOR DEBUGGING THROUGH SUPERVISORY OPERATING CODES AND SELF MODIFYING CODES

(75) Inventors: Steve Roe, Woodinville, WA (US); Matt Pleis, Carnation, WA (US); Craig Nemecek, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 623 days.

(21) Appl. No.: 10/113,064

(22) Filed: Mar. 29, 2002

(51) Int. Cl.
G06F 9/44 (2006.01)
G06F 11/00 (2006.01)

(52) U.S. Cl. .................. 717/134; 717/129; 712/227; 714/35

(58) Field of Classification Search ............ 717/130, 717/129, 134; 714/28, 34, 35, 45; 703/24, 703/28; 712/227
See application file for complete search history.

(56) References Cited

U.S. PATENT DOCUMENTS

| | | | | |
|---|---|---|---|---|
| 5,321,828 A | * | 6/1994 | Phillips et al. ............ | 703/28 |
| 5,325,512 A | * | 6/1994 | Takahashi ................. | 703/28 |
| 5,493,723 A | * | 2/1996 | Beck et al. ............... | 703/28 |
| 5,630,052 A | * | 5/1997 | Shah ........................ | 714/38 |
| 5,752,013 A | * | 5/1998 | Christensen et al. ...... | 712/227 |
| 6,075,941 A | * | 6/2000 | Itoh et al. ................ | 717/128 |
| 6,094,730 A | * | 7/2000 | Lopez et al. .............. | 714/28 |
| 6,374,370 B1 | * | 4/2002 | Bockhaus et al. ......... | 714/39 |
| 6,829,727 B1 | * | 12/2004 | Pawloski ................... | 714/28 |
| 2002/0052729 A1 | * | 5/2002 | Kyung et al. ............. | 703/28 |
| 2003/0149961 A1 | * | 8/2003 | Kawai et al. ............. | 717/129 |

* cited by examiner

Primary Examiner—Tuan Dam
Assistant Examiner—Eric B. Kiss

(57) ABSTRACT

Embodiments of the present invention effectuate a method and system for debugging a device such as a microcontroller in a distributed architectural scheme, where the device may operate at speeds much faster than the debugger program is run, with limited debugging resources physically incorporated into the device itself, and with relatively limited computational capacity, vis-à-vis the platform deploying the debugging software. The embodiments place relatively modest, uncomplicated demands on the debugger software, and the ICE may also be relatively simple. Further, debugging methods and systems according to these embodiments are flexible and adaptable to a variety of different devices that must undergo debugging, yet remain effective, simple, and inexpensive.

23 Claims, 6 Drawing Sheets

METHOD AND SYSTEM FOR DEBUGGING THROUGH SUPERVISORY OPERATING CODES AND SELF MODIFYING CODES

TECHNICAL FIELD

The present invention relates to the field of software and hardware development. Specifically, the present invention relates to development tools, especially useful for debugging microcontroller programs.

BACKGROUND ART

Debugging software (e.g., a debugger) effectuates correction of problems in software by finding errors in program logic, and in hardware by finding errors in circuitry. Debuggers can be used to stop programs at certain breakpoints and display various programming elements. This allows programmers to step through program source code statements individually and sequentially, while corresponding machine instructions are being executed and observed, and correct and/or modify the code as necessary.

Conventional debuggers operate to stop programs at the breakpoints by implementing system management interrupts (SMI) or similar functions. However, SMIs and similar approaches to halting program execution at breakpoints are effective in situations wherein the debugger program is run on the same computer executing the machine instructions. Ordinarily, this approach is sufficient for most conventional debugging applications, because the single machine architecture is quite typical.

However, in a distributed hardware architectural environment, the approach becomes problematic. One such architecture may constitute several different devices, operating at different speeds and with vast differences in computational characteristics. Such characteristics include, but are not limited to, processing power and memory, and even internal structure and function. Further, some of the devices may incorporate functionalities not amenable to simulation via the debugger.

For instance, one model may incorporate a host computer as a platform for the debugger software and an external circuit or other computer, upon which the debugging program is executed. An in-circuit emulator (ICE) may be deployed in this model, to facilitate debugging and other testing of the external circuit or computer. Such external circuits or computers may include analog and/or other functionalities, which the debugger is unable to test.

The components of this model differ in both the dimensions of speed and computing power as follows. In the circuit or computer being debugged, operations occur fast, at hardware level speeds. However, the circuit may be of relatively limited computational capacity and specific computing function. The ICE may share similar such attributes.

The host computer may have vastly superior computational resources vis-à-vis the computer/circuit being debugged and/or the ICE, with much more powerful processors and memory. Furthermore, the host computer may deploy the debugger via an application. For example, if the host computer is a PC, the debugger may be run by a Windows™ application. Thus, the debugger software therein may be constrained to run at a relatively slow speed, despite the speed of the host computer's processors. This speed may be limited to the speed of the application deploying it.

In order to test functionalities not amenable to simulation via the debugger, such as analog systems, conventional testing requires the use of special hardware. Certain conventional emulators may be designed and applied to achieve real analog circuit testing performance during debugging. However, these conventional emulators require the addition of a significant degree of complex debugging circuitry to the system to be debugged. This is expensive, resource intensive, and complicated.

Conventional debuggers may allow modification of code during the debugging sessions. However, this is only achievable conventionally with two further expenses. First, complicated debugging hardware may be required, as discussed above. Second, in each and every instance that code is modified during a debugging session, the debugging session must be reset. For instance, the debugging session cannot continue executing; it must begin anew at its initial steps. This is labor intensive, expensive, and requires inordinate amounts of time.

In a distributed hardware, the emulator needs to execute in lock step with the processor under test, according to the overall debug framework. However, certain functions of the microprocessor may be inaccessible to the emulator, and thus to the debugger. Thus, remaining synchronized may be problematic for the microprocessor and emulator, when executing functions requiring calls to host computer in conventional schemes.

Debugging in accordance with the conventional art is problematic therefore for a number of reasons. Conventional debugging is not easily open to efficient utilization in a distributed hardware environment. Conventional debugging may also require special hardware to implement special functions not amenable to debugging per se and/or to allow code modification during debugging. Further, code modifications during debugging sessions require restarting the session, and repeating. These problems render debugging in a distributed hardware environment by conventional means expensive, time consuming, resource intensive, and laborious.

SUMMARY OF THE INVENTION

What is needed is a system and/or method for debugging that is easily open to efficient utilization in a distributed hardware environment. What is also needed is a system and/or method for debugging that does not require elaborate hardware to implement special functions not amenable to debugging per se and/or to allow code modification during debugging. Further, what is needed is a system and/or method for debugging wherein code modification implemented during a debugging session does not require restarting and/or repeating the session. Additionally, what is needed is a system and/or method for debugging that ensures lockstep execution during supervisory calls and flash updates. Embodiments of the present invention provide the above advantages.

In a system comprising, for example, a host computer deploying a debugger program and an in-circuit emulator (ICE) coupled to the host computer on one end and to a device on the other, one embodiment of the present invention effectuates a method for debugging the device. The system does this by scanning a user code for supervisory operations and setting corresponding break points in the user code, prior to running it. Upon running the user code and detecting that one of the supervisory operations is imminent, the supervisory operation is executed in the device and the user code is re-scanned. The break points may be set either by the debugger or the ICE.

Upon detecting a supervisory operation, the ICE halts the device and signals the debugger that a break point has been reached. An instruction from the program corresponding to the supervisory operation is downloaded to the device. The device executes the program. The device is queried as to its state and in response, the ICE is updated and the device receives corrections, as needed. Further, any code modifications are detected and the ICE is updated and the break points are reset accordingly. In this fashion, the ICE and the device may remain in lock-step execution through the event. The ICE is not allowed to execute the supervisory operation, so it peeks at the results of the execution thereof by copying the state of the device.

Another embodiment effectuates another method for debugging the device, with user code running on a similarly constituted system. Upon detecting a supervisory operation of a type that may, upon execution, potentially modify the code, the present embodiment executes the supervisory operation in the device and subsequently re-parses the user code within it. This may be achieved by querying the device as to one of its components, one that was updated by the supervisory operation. Any newly promulgated supervisory operation within the device is sought. In response to detecting any, the device, the ICE, and the host computer are all updated and new corresponding breakpoints are re-flagged. Further, the old supervisory operation flags may be marked as invalid, and a user alert may be promulgated.

According to embodiments of the present invention, a device such as a microcontroller may be debugged in a distributed architectural scheme, where the device may operate at speeds much faster than the debugger program is run, with limited debugging resources physically incorporated into the device itself, and with relatively limited computational capacity, vis-à-vis the platform deploying the debugging software. The software demands on the debugger are not complicated by the debugging schemes of the present embodiments, and the ICE may also be kept relatively simple. Further, debugging schemes of the present embodiments are flexible and adaptable to a variety of different devices that must undergo debugging, yet the scheme remains effective, simple, and inexpensive.

The present invention solves device debugging in one embodiment using a generic approach by implementing supervisory operations as break points in the program execution by the device itself. In another embodiment, the present invention solves device debugging by parsing code following execution of supervisory operations that have the potential for modifying the code within the device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
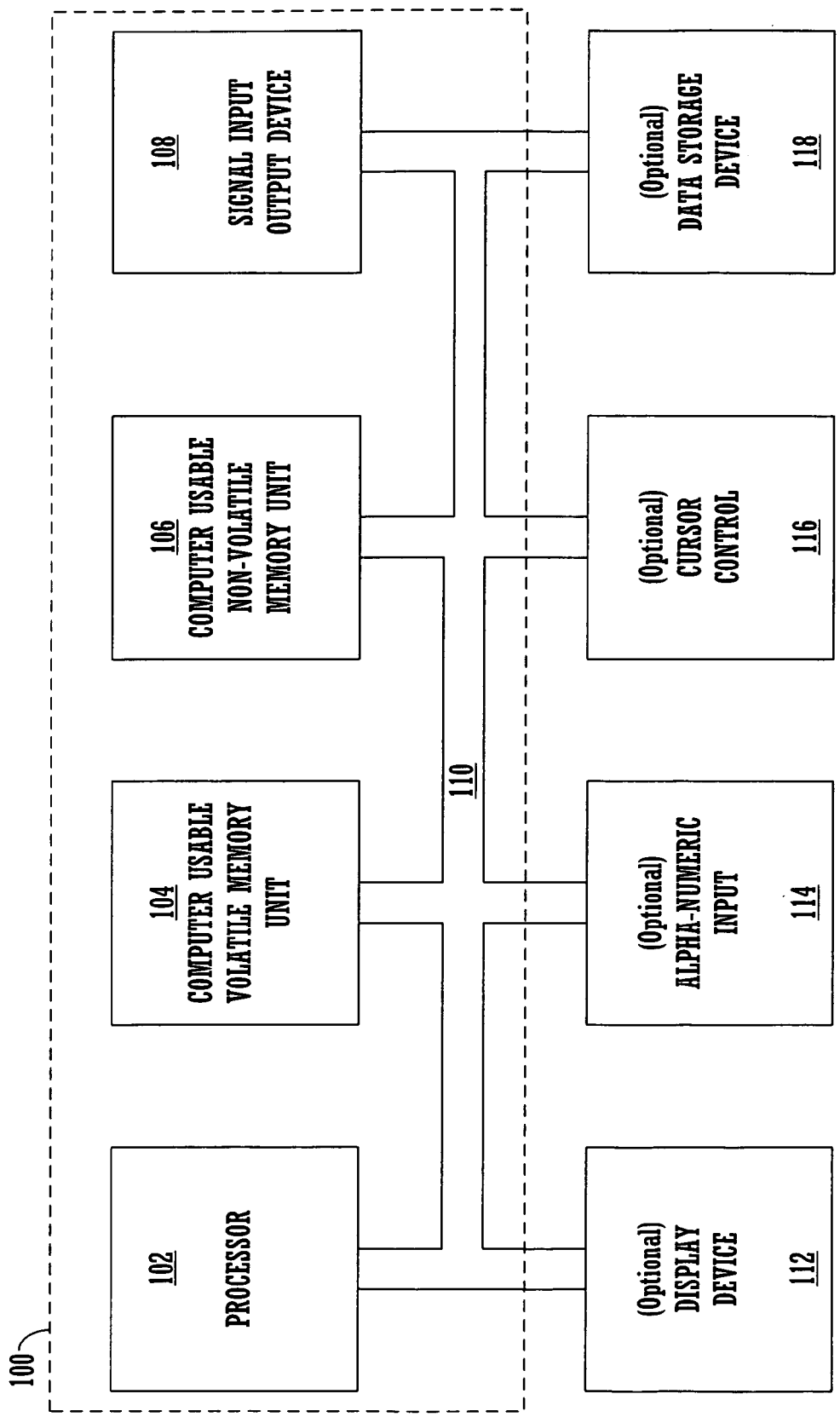
FIG. 1 illustrates a general purpose computer system, upon which embodiments of the present invention may be implemented.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "scanning," "re-scanning," "setting," "detecting," "debugging," "emulating," "running," "halting," "signaling," "downloading," "processing," "performing," "querying," "updating," "correcting," "resetting," "parsing," "re-parsing," "flagging," "re-flagging," "promulgating," "intercepting," or the like, refer to the action and processes of a computer system (e.g., system 100; FIG. 1), or similar electronic computing device, that manipulates and transforms data represented as physical, e.g., electronic quantities within the communications and computer systems' registers and memories into other data similarly represented as physical quantities within the computer system memories or registers or other such information storage, transmission, or display devices.

Further, embodiments of the present invention may be discussed in terms of computer processes. For example, FIGS. 4 and 5 refer to processes 400 and 500, performed in accordance with embodiments of the present invention for debugging which, in one embodiment, are carried out by processors and electrical/electronic components under the control of computer readable and computer executable instructions.

The computer readable and computer executable instructions reside, for example, in data storage features such as data storage device 118 and computer usable volatile memory 104 and/or computer usable non-volatile memory 106, all of FIG. 1. However, the computer readable and computer executable instructions may reside in any type of computer readable medium. Processes 400 and 500 may be performed by, e.g., executed upon software, firmware, and/or hardware or any combination of software, firmware, hardware, and/or by other effective mechanism or instrumentality, e.g., by other suitable means.

Exemplary Computer System Platform

FIG. 1 is a block diagram of one embodiment of an exemplary computer system 100 that can be used, for example, as a platform for embodiments of the present invention. System 100 is well suited to be any type of computing device (e.g., browser client computer, server computer, portable computing device, etc.).

Computer system 100 of FIG. 1 comprises an address/data bus 110 for communicating information, one or more central processors 102 coupled with bus 110 for processing information and instructions. Central processor unit 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) % coupled with bus 110 for storing static information and instructions for processor(s) 102. System 100 also includes one or more signal generating and receiving devices (I/O circuit) 108 coupled with bus 110 for enabling system 100 to interface with other electronic devices.

Optionally, computer system 100 can include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102.

The system 100 also includes a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics.

Exemplary Distributed Debugging System Architecture

Figure 2:
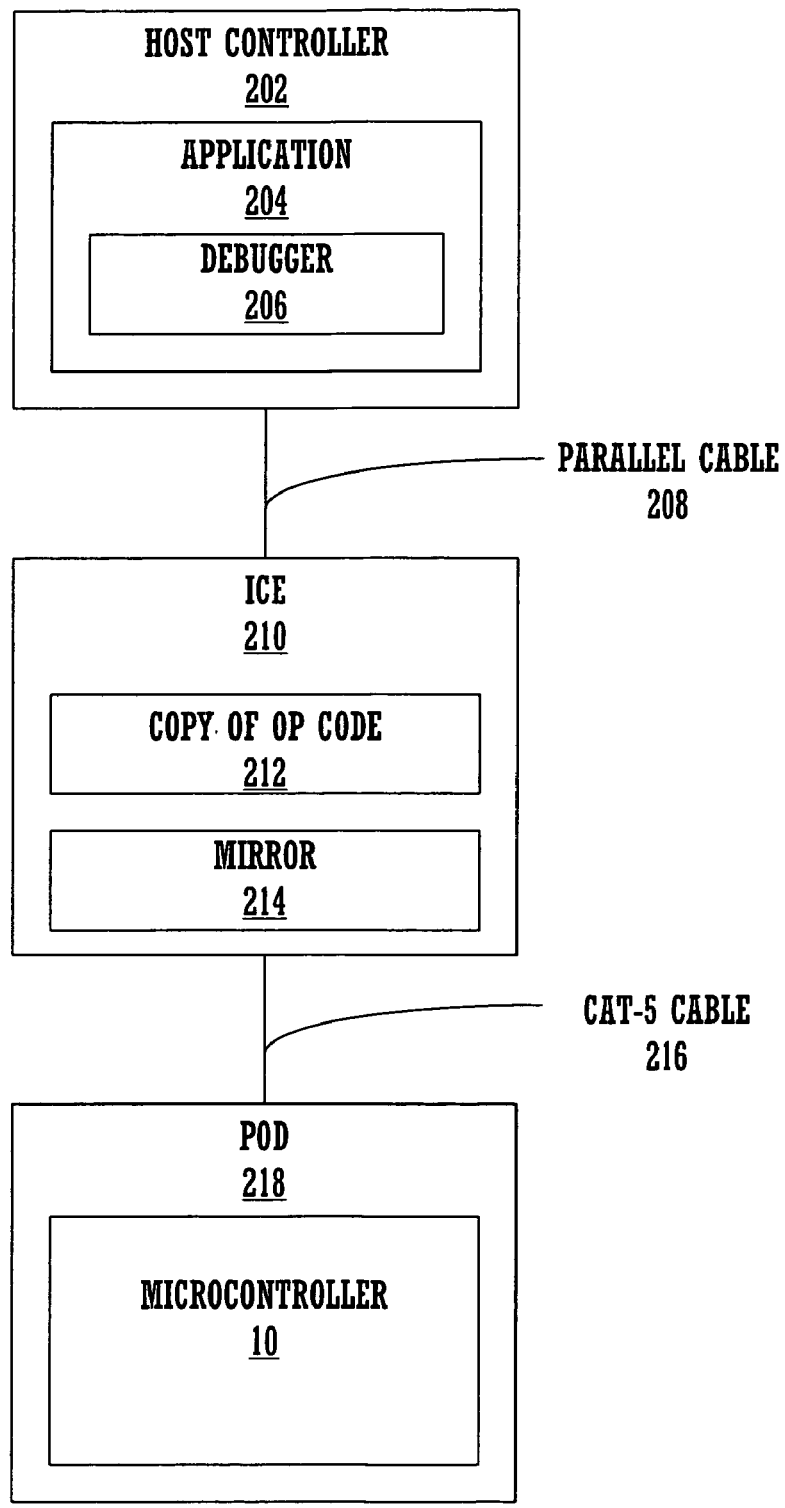
FIG. 2 is a block diagram of a system for implementing a debugger, in accordance with one embodiment of the present invention.

With reference now to FIG. 2, a system 200 effectuates a system for debugging through self modifying code and supervisory operating codes, according to an embodiment of the present invention. In the present embodiment, a debugging software suite 206 is deployed upon an application 204 within a host computer 202. Host computer 202 is any type of computer system capable of functioning as a platform for the software constituting debugger 206. For example, host computer may be a PC, with a high capacity RAM and disc storage, and powerful processors, deploying a Windows™ application.

A parallel cable 208 couples host computer 202 to an in-circuit emulator (ICE) 210. ICE 210 contains a copy 212 of operating code promulgated by the debugger 206. ICE 210 also contains a section 214 mirroring components of a circuit under test. The circuit under test in the present environment is a pod 218, connected to ICE 210 by a Category 5 cable 216, capable of transfer data at a rate of 100 Mbps or greater. ICE 210 has a data storage capacity of 128 Kbytes, and while rather fast, is of limited computational power, vis-à-vis host computer 202.

Figure 6:
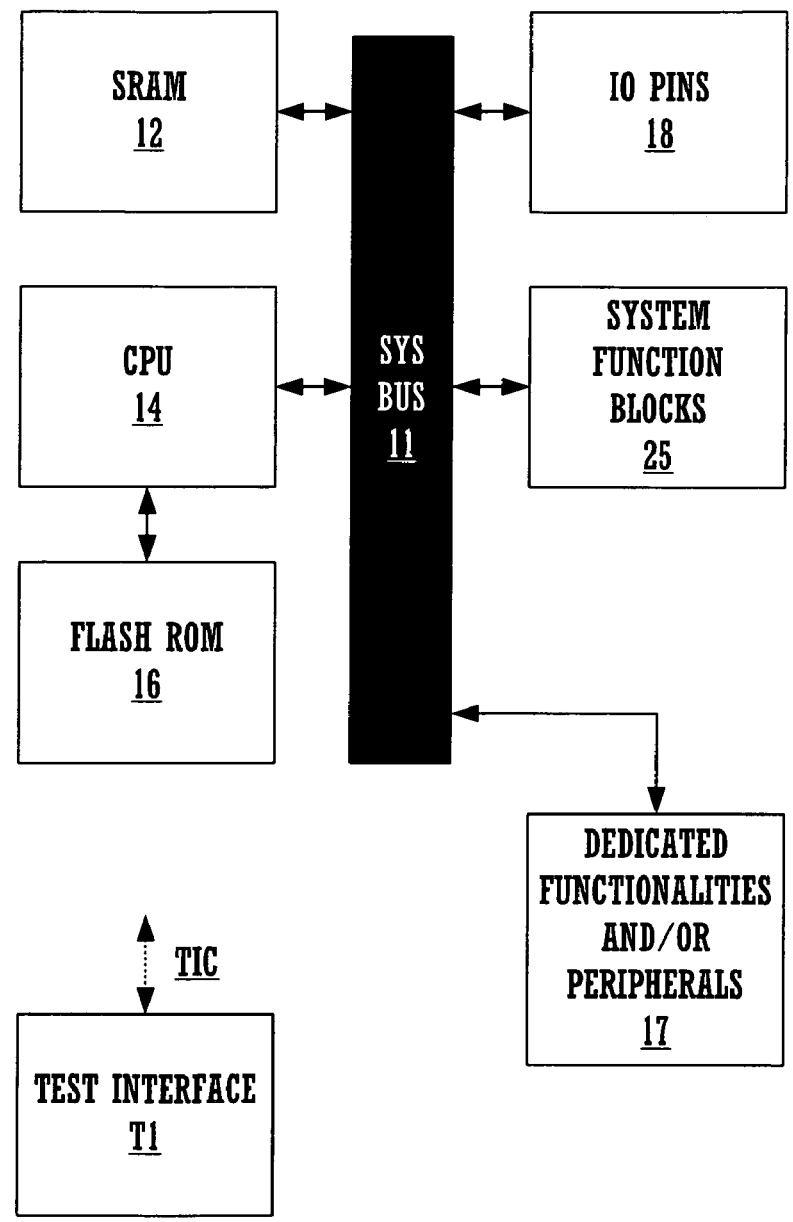
FIG. 6 is a block diagram of a microcontroller device amenable to debugging in accordance with an embodiment of the present invention.

Pod 218 deploys a microcontroller 10 with 256 bytes of RAM and 16 Kbytes of program space. Microcontroller 10 may incorporate features as discussed below (FIG. 6, 7, 8).

The architecture of system 200 constitutes three different, separate components, operating at different speeds and with vast differences in computational characteristics, including but are not limited to processing power and memory, and even internal structure and function. System 200 effectuates debugging operations in a low cost, flexible, distributed architecture. It is appreciated that in another embodiment, system 200 may be constituted by components different from those described herein, which are exemplary and one effective functional architecture, but in no way meant to express or imply exclusive applicability. Signalling between the components, in various embodiments, may be accomplished in different ways as well. For example, another embodiment may distribute signals between components using universal serial bus (USB), Ethernet, Firewire, etc.

Furthermore, system 200 is effectively adaptable to the limited supervisory capabilities of relatively lower level integrated circuit (IC) computing devices (e.g., chip), exemplified by microcontroller 10. Advantageously, this adaptability allows changing supervisory capabilities handled by the chip, without necessitating modification of much if any of the higher level capabilities of debugger 206.

Figure 3:
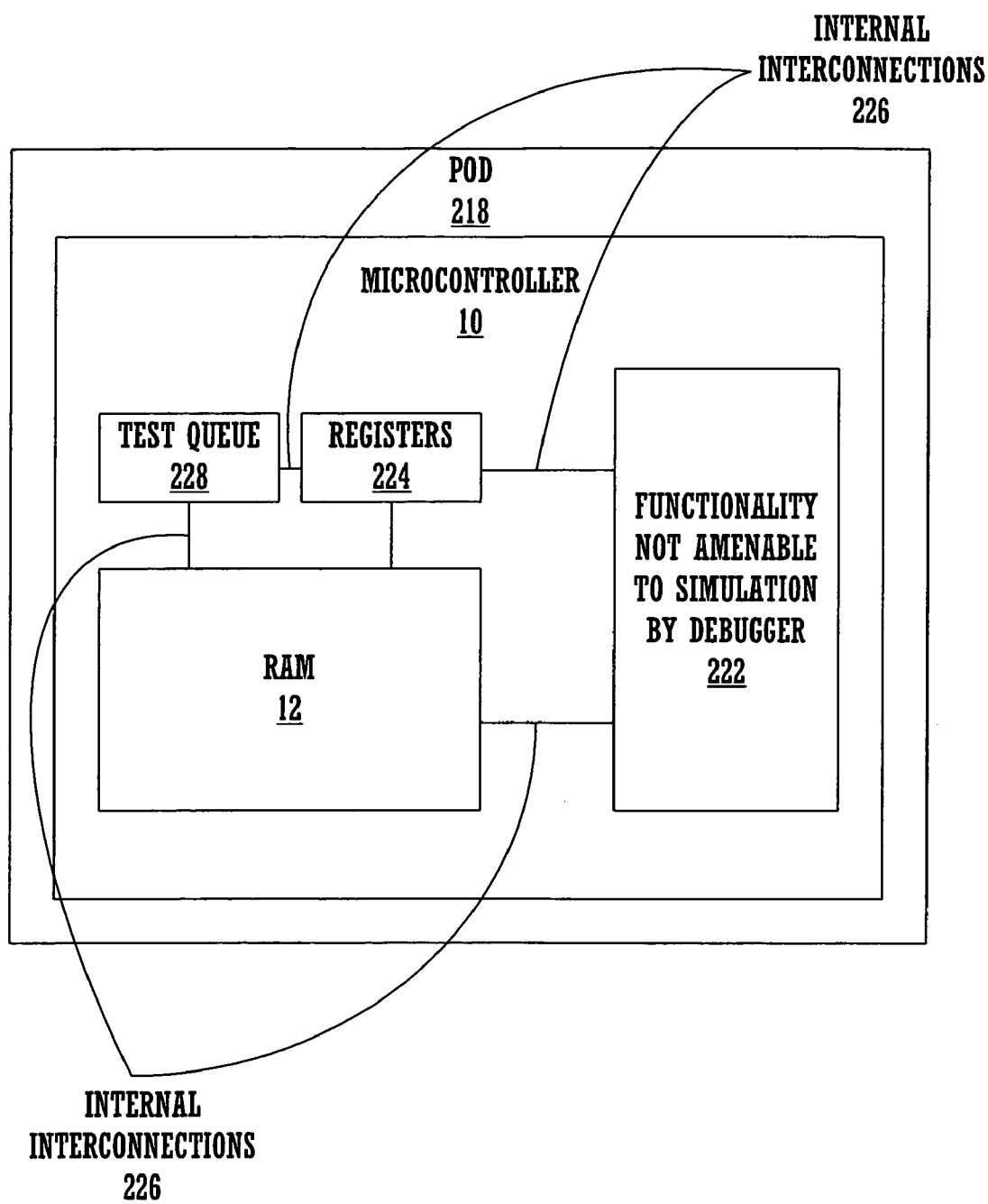
FIG. 3 is a block diagram of a component of a system for implementing a debugger, in accordance with one embodiment of the present invention, wherein a device within the component is unable to be simulated by the debugger.

With reference to FIG. 3, microcontroller 10, residing in pod 218, is shown with several constituents. An internal block 222, in one embodiment an array of programmable analog functionalities, is incapable of simulation by the debugger 206 (FIG. 2). The state of these analog functionalities is communicated to registers 224 by an internal interconnect 126. Furthermore, a test queue 228, in one embodiment, has a 4-byte capacity inapplicable to end user applications into which supervisory operating instructions are inserted. Test queue 228 may be filled and queried via a test interface and test interface coupler (e.g., test interface TI, test interface coupler TIC; FIG. 6). The test queue 228 provides a mechanism by which an external system may queue and execute microcontroller code independently of the microcontroller's program store. In another embodiment, the test queue 228 may have a different capacity and/or accessibility.

Such instructions detect impending supervisory operations, perform correspondingly necessary preprocessing, run the supervisory operation on the chip level, and perform corresponding post-supervisory operation functions to allow resumption of normal chip operations.

With reference again to FIG. 2, in the distributed architecture of system 200, host computer 202, running the debugger 206, uses code to recognize that a potential for a supervisory operation exists within the code running out in pod 218 and ICE 210. Within the supervisory code, a certain sequence of bytes is standardized as a signature for an impending supervisory operation. Scanning for the signature within the code running in pod 218, the debugger 206 goes to each locus in the code at which the signature is detected. Accordingly, it notifies ICE 210 that a code update is imminent, allowing ICE 210 to take itself off line during the supervisory operation execution, and allowing it to prepare for the operation, as well as for recovering from it. This allows all components of system 200 to remain in lock step.

Upon detecting the signature code, preparations are made through several instructions in a certain order. Thus, when a program image is downloaded to ICE 210 from host computer 202, the program image is scanned for the supervisory signatures. In this way, a program operation may be intercepted (e.g., anticipated expectantly) before a supervisory call. In one embodiment, at the places they are found, they are replaced in the copy of the program in ICE 210 by a 'halt' instruction, effectively setting breakpoints in the code. These remind the host computer 202 that a break point has been reached. They are not direct functions of the signatures, but rather the recognition of the 'halt' instructions in ICE 210 with which they were replaced. In another embodiment, another mechanism for intercepting a program operation prior to a supervisory call may be used. For example, in an alternative embodiment, a 'halt' operating code, or a trap instruction, etc., may be used toward this end.

Upon the functioning of the program instructions, a break point is reached and program execution stops accordingly. Noting that a supervisory instruction has been reached, in pod 218 preparations are made to execute the supervisory instruction. For example, a first part of test queue 228 (FIG. 3) may be filled with applicable test data. The parameters of the supervisory operation are ascertained, the characteristics of the microcontroller, such as register states, analog and digital block states, RAM content, etc., is compared with the content of the test queue 228, and the supervisory operation is executed in pod 118, which stops upon its completion. Meanwhile, the ICE 210 has executed a single 'halt' instruction and ceased running. Within host computer 202, debugger 206 then interrogates pod 218 to ascertain what happened therein during the supervisory operation, then restarts and brings ICE 210 back into synchronism with the rest of system 200, and proceeds running its program. Examples of supervisory operations to which pod 218 may be subjected include but are not limited to the following.

A 'table read' operation reads configuration parameters from microcontroller 10. It is appreciated that such parameters are read only from microcontroller 10, and neither from ICE 210, nor from the host computer 102. After its completion, these parameters are read from internal storage within microcontroller 10 and placed in a special locus within its RAM 12 and registers 224. Debugger 206 then re-synchronizes ICE 210 with pod 218 by copying that program section from microcontroller 10 into the RAM 12 of ICE 210.

The debugger proceeds to execute code instructing 'read results of table read.' Attributes such as microprocessor CPU 14 (FIG. 6, 7, 8) flags are fixed only when pod 218 is executing supervisory code, and no other kind of code. In cases wherein the CPU 14 flags change, ICE 210 is halted. Thus, upon re-synchronizing, ICE 210 catches up with pod 218 and fixes the flags of CPU 14 accordingly.

In a 'flash write' operation, upon hitting the break point, in preparation, debugger 206 identifies its 'flash write' operation. It determines applicable parameters involved and it determines which buffer will be addressed and the expected effect on program memory. Upon running the supervisory operation, within microcontroller 10, internal flash memory 16 (FIG. 7) is updated. Upon completion, the mirror memory 214 of ICE 210 is accordingly updated to reflect the update to the flash memory 16 of microcontroller 10. In some such applications, the flash memory 16 of microcontroller 10 is effectively unobservable directly by debugger 106. Thus, debugger 206 infers its effects from the operational input and calculates its expected effects, which it applies to ICE 210. It is appreciated that these exemplary functions may be applied to a wide variety of different chips and debugging devices.

Advantageously, this is accomplished in the present embodiment with minimal code and other software requirements. One minimal requirement is to ascertain that ICE 210 indeed halts upon the breakpoint signifying a supervisory operation, allow the microcontroller 10 or other chip to execute the supervisory operation, and immediately stop. Then, the resultant post supervisory operational condition of microcontroller 10 is ascertained. For instance, determinations may then be made such as what condition does flash memory 16 achieve, what are the resultant contents of RAM 12 (FIG. 6, 7, 8), in what state are registers 224 (FIG. 3), and at what point is its operational code wind up in, and any changes the code therein has sustained.

Figure 4:
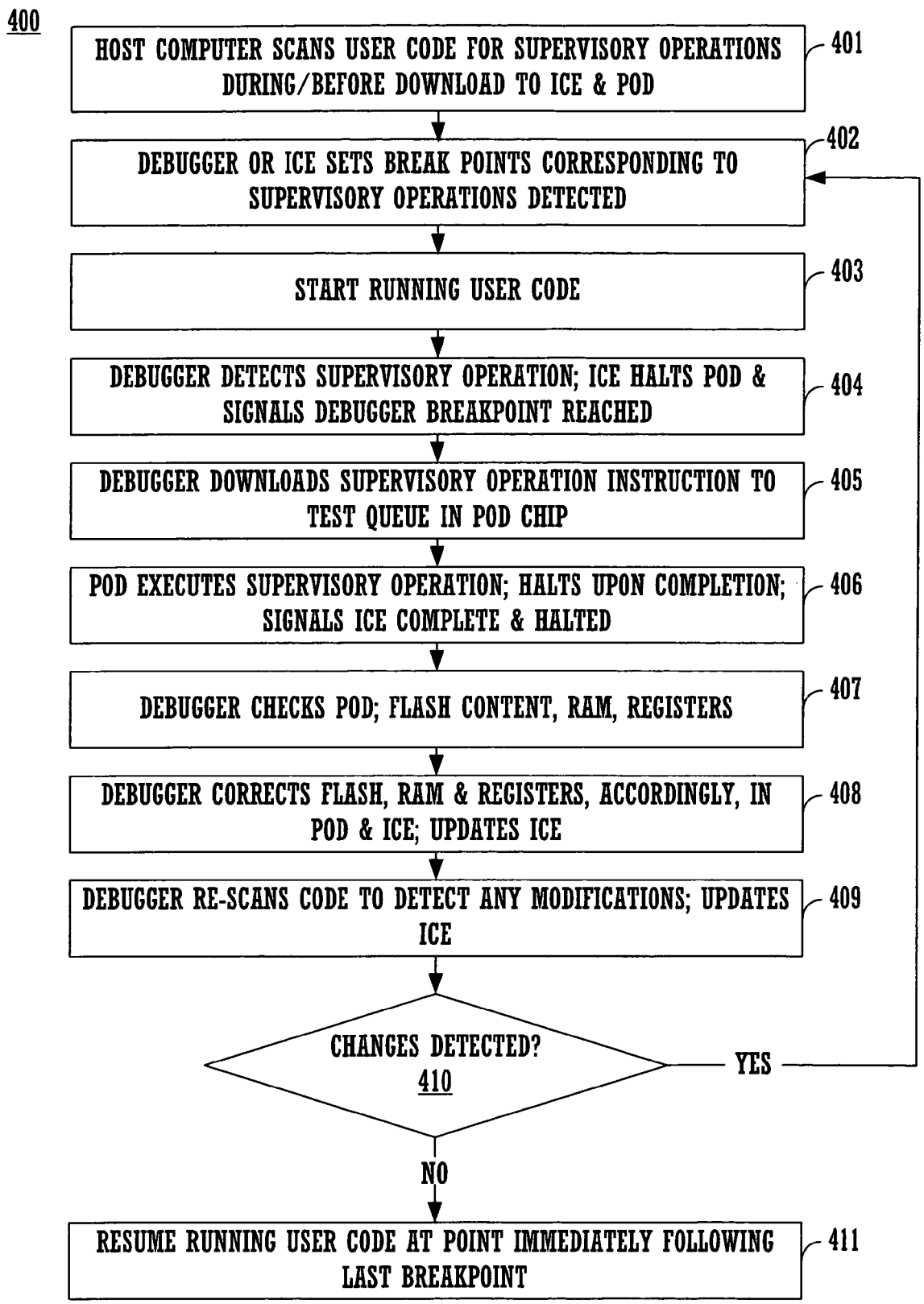
FIG. 4 is a flow chart of a method for debugging through supervisory operating codes, in accordance with an embodiment of the present invention.

With reference to FIG. 4, a process 400 is described for debugging through supervisory operations, in accordance with one embodiment of the present invention.

Process 400 begins with step 401, wherein a host computer, such as through debugging software (e.g., host computer 202, debugger 206; FIG. 2) scans user code for supervisory operations prior to and/or during download to an ICE and pod (e.g., ICE 210, pod 218; FIG. 2).

In step 402, either the debugger or the ICE, under direction of the debugger, sets break points corresponding to the supervisory operations detected. In step 403, a user code begins to run.

In step 404, as the user code is running, the debugger detects therein a supervisory operation. This may be detected by a coded signature, or by other signs signifying the approach of the supervisory operation. Upon detecting the supervisory operation, the ICE halts the pod and concomitantly signals the debugger that a corresponding break point has been reached and that the pod's code running operation has been halted.

In step 405, the debugger then downloads an instruction required to execute the supervisory operation and an instruction to halt after the supervisory operation has been executed. The download is made, for example, to a test queue in the pod (e.g., test queue 228; FIG. 3).

In step 406, the pod executes the supervisory operation. The pod halts upon completing the execution of the supervisory operation and signals the ICE. The pod thus informs the ICE that the execution of the supervisory operation has been completed and that the pod has again halted.

In step 407, the debugger queries the pod to check its flash program memory content, the contents of its RAM, and the state of its registers (e.g., flash 16 and RAM 12, FIG. 6, 7; registers 224, FIG. 3). The flash memory content may also be inferred, in one embodiment, from the program state before the supervisory operation and the return codes from the supervisory operation.

Upon ascertaining the pod memories' contents and the state of its registers, in step 408 the debugger corrects its duplicate contents of the flash, RAM, and registers accordingly. It also checks and correspondingly corrects the contents of the memories in the ICE. Further, the debugger updates the ICE as to the changes, if any, in the configuration of the pod. The ICE is updated such that its state matches that of the pod.

In step 409, the debugger re-scans the code to detect any modifications and correspondingly updates the ICE in these regards.

In step 410, it is determined if the debugger, on re-scanning the code, has detected any changes therein. If so, process 400 loops back to step 402, wherein either the debugger or the ICE sets new break points corresponding to any new supervisory operations promulgated by the changes to the code detected in step 409.

If no changes in the code were detected however, in step 411 process 400 continues with running the user code at the point immediately following the last break point. This completes process 400.

Figure 5:
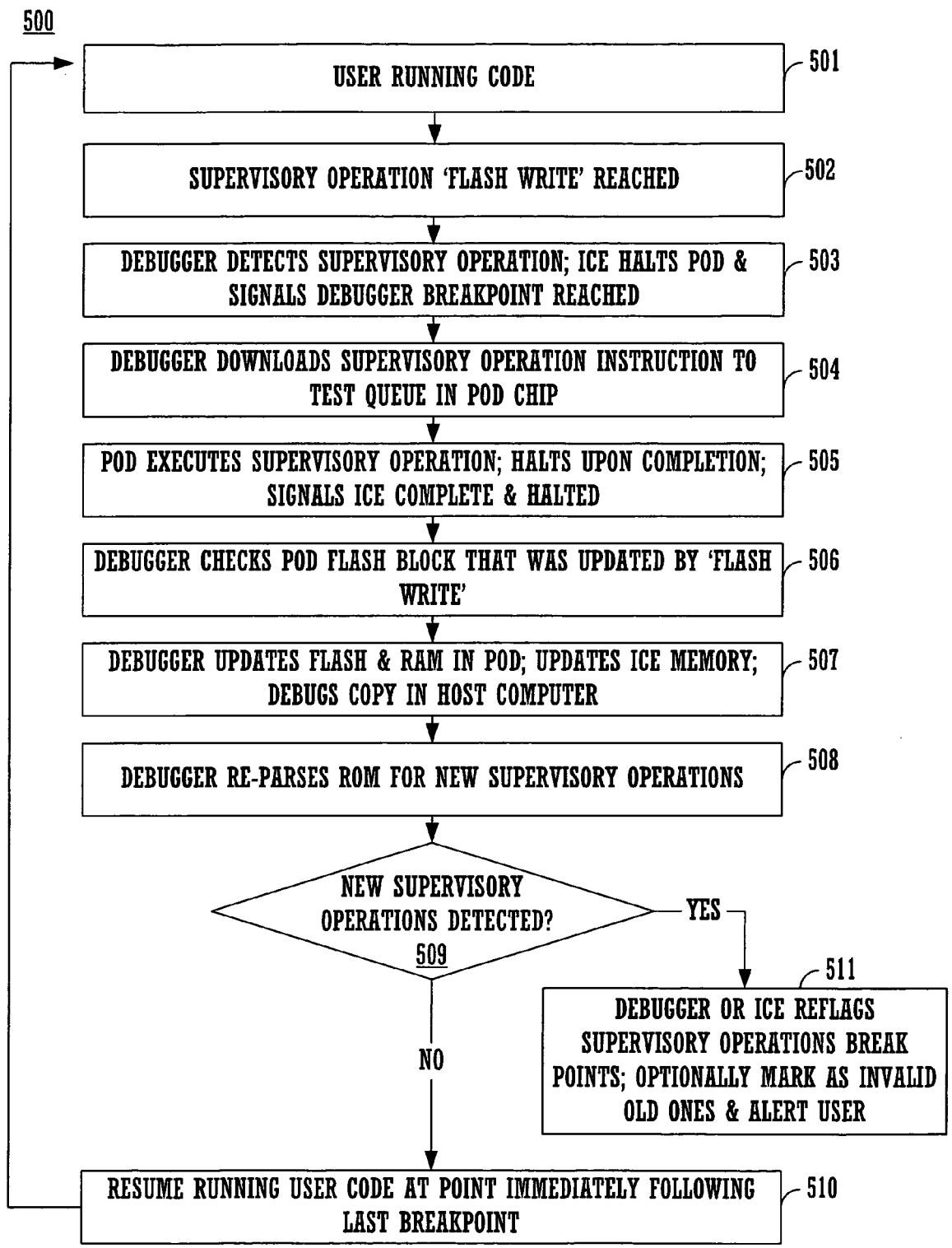
FIG. 5 is a flow chart of a method for debugging through self modifying codes, in accordance with an embodiment of the present invention.

With reference to FIG. 5, a process 500 effectuates a method of debugging through self modifying code, in accordance with one embodiment of the present invention. Process 500 begins with step 501, wherein user code is running.

In step 502, a supervisory operation such as a 'flash write' is reached in the execution of the user code. It is appreciated that other supervisory operations beside the exemplary 'flash write' supervisory operation may result in code self modification. The 'flash write' supervisory operation is used herein for illustrative purposes only, and is not meant to limit supervisory operations amenable to debugging through self modifying code in any way, express or implied.

In step 503, as the user code is running, a debugger running on a host computer (e.g., debugger 206, host computer 202; FIG. 2) detects within the code the 'flash write' supervisory operation. This may be detected by a coded signature, or by other signs signifying the approach of the supervisory operation. Upon detecting the supervisory operation, an ICE halts a pod (e.g., ICE 210, pod 218; FIG. 2), and concomitantly signals the debugger that a corresponding break point has been reached and that the pod's code running operation has been halted.

In step 504, the debugger then downloads to a test queue (e.g., test queue 228; FIG. 3) in the pod an instruction required to execute the 'flash write' supervisory operation and an instruction to halt after the supervisory operation is complete.

In step 505, the pod executes the supervisory operation. The pod halts upon completing the execution of the supervisory operation and signals the ICE. Upon signaling, the pod informs the ICE that the execution of the supervisory operation has been completed and that the pod has again halted.

In step 506, the debugger queries the pod to check its flash block (e.g., flash 12; FIG. 7, 8), which was updated by execution of the 'flash write' supervisory operation. Alternatively, in one embodiment, the debugger may calculate the effect on the pod's flash from the pod state before the operation and the return codes from the operation.

In step 507, the debugger updates its copies of the pod's flash and RAM (e.g., RAM 16; FIG. 7, 8) updates the memory in the ICE, and debugs a copy transferred to the host computer. The ICE is updated to match the pod.

In step 508, the debugger re-parses the program in ROM for newly appearing supervisory operations.

In step 509, it is determined whether new supervisory operations have been detected. If not, in step 510, the running of the user code is resumed at the point immediately following the last break point, and process 500 loops back to step 501, wherein the user code is running.

If it is determined that new supervisory operations have been detected, then in step 511, either the debugger or the ICE re-flags the supervisory operations break points. Optionally, the old supervisory operations break points may be marked as invalid, and a user alert promulgated. This completes process 500.

Referring now to FIG. 6, a block diagram shows a high level view of an exemplary integrated circuit (or microcontroller) 10 which resides in a pod (e.g., pod 218; FIG. 2, 3) upon which embodiments of the present invention may be implemented. In this embodiment, integrated circuit 10 includes a bus 11, and coupled to bus 11 are synchronous random access memory (SRAM) 12 for storing volatile or temporary data during firmware execution, central processing unit (CPU) 14 for processing information and instructions, flash read-only memory (ROM) 16 for holding instructions (e.g., firmware), input/output (I/O) pins providing an interface with external devices and the like, and system function blocks 25. The system function blocks 25 include both analog blocks 20, and digital blocks 100, which are further described below. A test interface TI may be coupled to integrated circuit 10 via a test interface coupler TIC, which may be detachable, to perform debugging operations during startup and initialization of the integrated circuit. Test interface TI may be implemented, in one embodiment, by a connection and input functionality to a test queue (e.g., test queue 228; FIG. 3), and test interface coupler TIC may be deployed through an ICE and a Category-5 cable (e.g., ICE 210, Cat-5 cable 216; FIG. 2).

In the present embodiment, flash ROM 16 stores parameters describing microcontroller 10, allowing microcontroller 10 to be programmed during production, during system testing, or in the field. It is contemplated that microcontroller 10 may also be self-programmed remotely. System function blocks 25 are configurable system resources that can reduce the need for other microcontroller parts and external components.

In summary, in a system comprising, for example, a host computer deploying a debugger program and an in-circuit emulator (ICE) coupled to the host computer on one end and to a device on the other, one embodiment of the present invention effectuates a method for debugging the device. Debugging is achieved by intercepting a supervisory operation prior to its execution. In one embodiment, this interception is done by scanning a user code for supervisory operations and setting corresponding break points in the user code, prior to running it. Upon running the user code and detecting that one of the supervisory operations is imminent, the supervisory operation is executed in the device and the user code is re-scanned. The break points may be set either by the debugger or the ICE. In alternative embodiments, halts and/or traps, etc. effectuate intercepting the supervisory operation prior to its execution.

Upon detecting a supervisory operation, the ICE halts the device and signals the debugger that a break point has been reached. An instruction corresponding to the supervisory operation is downloaded to the device. In re-scanning the user code, the device is queried as to its state and in response, the ICE is updated and the debugger tracks the actual state of the device. Further, any code modifications are detected and the ICE is updated and the break points are reset accordingly.

In a similarly constituted system, with user code running, one embodiment of the present invention effectuates another method for debugging the device. Upon detecting a supervisory operation of a type that may, upon execution, potentially modify the code, the present embodiment executes the supervisory operation in the and subsequently re-parses the user code within it. This may be achieved by querying the device as to one of its components, one that was updated by the supervisory operation. Any newly promulgated supervisory operation within the device is sought. In response to detecting any, the device, the ICE, and the host computer are all updated and new corresponding breakpoints are re-flagged. Further, the old supervisory operation flags may be marked as invalid, and a user alert may be promulgated.

Embodiments of the present invention implement a method and system for debugging a device such as a microcontroller in a distributed architectural scheme, where the device may operate at speeds much faster than the debugger program is run, with limited debugging resources physically incorporated into the device itself, and with relatively limited computational capacity, vis-à-vis the platform deploying the debugging software. The software demands on the debugger are not complicated by the debugging schemes of the present embodiments, and the ICE may also be kept relatively simple. Further, debugging schemes of the present embodiments are flexible and adaptable to a variety of different devices that must undergo debugging, yet the scheme remains effective, simple, and inexpensive.

The present invention solves device debugging in one embodiment using a generic approach by implementing supervisory operations as break points in the program execution by the device itself. In another embodiment, the present invention solves device debugging by parsing code following execution of supervisory operations that have the potential for modifying the code within the device.

Thus a method and system for debugging through supervisory operating codes and self-modifying codes is described. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the Claims appended hereto and their equivalents.

What is claimed is:

1. In a system comprising a host computer deploying a debugger and an in-circuit emulator coupled to said host computer wherein said in-circuit emulator is further coupled to a device, a method for debugging said device, said method comprising:
   upon said device and said in-circuit emulator executing program code in lock-step fashion, intercepting an operation prior to its execution;
   flagging a code with a marker corresponding to said operation to render said operation detectable prior to executing said code;
   upon executing said code, detecting said operation and halting said in-circuit emulator;
   executing said operation in said device;
   querying said device as to its internal state; and
   in response to said querying, updating an internal state of said in-circuit emulator to match said internal state of said device.

2. The method as recited in claim 1, wherein said intercepting further comprises:
   scanning a code for an operation prior to executing said code;
   setting a break point in said code corresponding to said operation prior to executing said code.

3. The method as recited in claim 2 wherein said halting further comprises implementing said corresponding break point and halting said device and said emulator.

4. The method as recited in claim 2 wherein said setting a break point is performed selectively by said debugger and by said in-circuit emulator.

5. The method as recited in claim 1 wherein said markers are halts or traps.

6. The method as recited in claim 1 wherein said operation comprises a supervisory operation.

7. The method as recited in claim 1 further comprising:
   detecting a modification to said code that adds a new operation, wherein said modification is executed by said operation; and
   in response to said detecting a modification, setting a new breakpoint.

8. In a debugging system comprising a host computer deploying a debugger program and an in-circuit emulator coupled to said host computer and wherein said in-circuit emulator is coupled to a device, a method for debugging said device, said method comprising:
   upon said device and said in-circuit emulator executing program code in lock-step fashion, scanning a code for an operation prior to executing said code;
   setting a break point in said code corresponding to said operation prior to executing said code;
   upon executing said code, detecting said operation and implementing said corresponding break point;
   executing said operation in said device;
   querying said device as to its internal state; and
   in response to said querying, updating an internal state of said in-circuit emulator to match said internal state of said device.

9. The method as recited in claim 8 wherein said setting a break point is performed selectively by said debugger and by said in-circuit emulator.

10. The method as recited in claim 8 wherein said method further comprises, in response to said querying, correcting said state.

11. The method as recited in claim 8 further comprising re-scanning said user code wherein said re-scanning said user code further comprises:
   detecting a modification to said code that adds a new operation, wherein said modification is executed by said operation; and
   in response to said detecting a modification, setting a new breakpoint.

12. The method as recited in claim 11 herein said method further comprises resetting said break points accordingly.

13. A debugger system comprising:
   a host computer system for scanning a program code for special operations and for inserting a breakpoint into said program code for each special operation detected;
   an in-circuit emulator coupled to said host computer system and for executing said program code, wherein said in-circuit emulator halts execution upon reaching a breakpoint associated with a special operation, and wherein said in-circuit emulator signals said host computer system that said breakpoint has been reached; and
   a device coupled to said in-circuit emulator and for executing said program code in lock-step fashion, absent a breakpoint and wherein said device, in response to said special operation, executes a special program and signals completion to said in-circuit emulator which, in response thereto, queries said device and updates an internal state of said in-circuit emulator to match a current internal state of said device.

14. In a system comprising a host computer deploying a debugger and an in-circuit emulator coupled to said host computer wherein said in-circuit emulator is further coupled to a device, a method for debugging said device, said method comprising:

upon executing a user code, detecting a supervisory operation of said device wherein said supervisory operation selectively modifies said user code;

executing said supervisory operation in said device; and parsing said user code, wherein said parsing comprises:

querying said device as to an update thereto, said update corresponding to said supervisory operation;

detecting a newly promulgated supervisory operation; and in response to said detecting a newly promulgated supervisory operation, updating said device, said host computer and said in-circuit emulator, wherein an internal state of said in-circuit emulator is updated to match an internal state thereof corresponding to said update thereto corresponding to said supervisory operation.

15. The method as recited in claim 14 wherein said detecting said supervisory operation further comprises:

halting said device;

signaling said debugger that a break point has been reached; and downloading to said device an instruction corresponding to said supervisory operation;

wherein said halting and said signaling are performed by said in-circuit emulator.

16. The method as recited in claim 14 further comprising, in response to said detecting a newly promulgated supervisory operation, re-flagging corresponding breakpoints.

17. The method as recited in claim 16 further comprising marking changed supervisory operation flags as invalid.

18. The method as recited in claim 16 further comprising promulgating an alert.

19. A debugging system comprising a host computer deploying a debugger program and an in-circuit emulator coupled to said host computer wherein said in-circuit emulator is coupled to a device and wherein said system performs a method for debugging said device, said method comprising:

upon running a user code wherein said device and said in-circuit emulator execute user code in lock-step fashion, detecting a supervisory operation of said device wherein said supervisory operation selectively modifies said user code;

executing said supervisory operation in said device; and parsing said user code, wherein said parsing comprises:

querying said device as to a component updated with said supervisory operation;

detecting a newly promulgated supervisory operation; and in response to said detecting a newly promulgated supervisory operation, updating said device, said host computer and said in-circuit emulator, wherein an internal state of said in-circuit emulator is updated to match an internal state thereof corresponding to said component updated with said supervisory operation.

20. The debugging system as recited in claim 19 wherein said detecting said supervisory operation further comprises:

halting said device;

signaling said debugger that a break point has been reached; and downloading to said device an instruction corresponding to said supervisory operation, wherein said halting and said signaling are performed by said in-circuit emulator.

21. The debugging system as recited in claim 19 wherein said method further comprises, in response to said detecting a newly promulgated supervisory operation, re-flagging corresponding breakpoints.

22. The debugging system as recited in claim 21 wherein said method further comprises marking changed supervisory operation flags as invalid.

23. The debugging system as recited in claim 21 wherein said method further comprises promulgating a corresponding alert.

\* \* \* \* \*